United States Patent
Mielenz et al.

(10) Patent No.: US 10,852,148 B2
(45) Date of Patent: Dec. 1, 2020

(54) METHOD AND APPARATUS FOR CREATING AN OPTIMIZED LOCALIZATION MAP AND METHOD FOR CREATING A LOCALIZATION MAP FOR A VEHICLE

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 16/307,343

(22) PCT Filed: Jun. 2, 2017

(86) PCT No.: PCT/EP2017/063539
§ 371 (c)(1),
(2) Date: Dec. 5, 2018

(87) PCT Pub. No.: WO2017/215964
PCT Pub. Date: Dec. 21, 2017

(65) Prior Publication Data
US 2019/0137286 A1     May 9, 2019

(30) Foreign Application Priority Data
Jun. 14, 2016 (DE) .......................... 10 2016 210 495

(51) Int. Cl.
*G01C 21/32*    (2006.01)
*G06F 16/29*    (2019.01)
(Continued)

(52) U.S. Cl.
CPC .............. *G01C 21/32* (2013.01); *G01S 13/89* (2013.01); *G01S 13/90* (2013.01); *G01S 19/48* (2013.01);
(Continued)

(58) Field of Classification Search
None
See application file for complete search history.

(56) References Cited

U.S. PATENT DOCUMENTS 7,119,832 B2 * 10/2006 Blanco ............... G08B 13/1672
348/148
7,233,683 B2 * 6/2007 Han ........................ G01S 19/48
382/104
(Continued)

FOREIGN PATENT DOCUMENTS

DE    102009017731 A1    11/2009
DE    102009045326 A1    4/2011
(Continued)

OTHER PUBLICATIONS

International Search Report for PCT/EP2017/063539, dated Aug. 3, 2017.

*Primary Examiner* — Richard M Camby
(74) *Attorney, Agent, or Firm* — Norton Rose Fulbright US LLP; Gerard Messina (57) ABSTRACT

The approach presented here relates to a method for creating an optimized localization map for a vehicle. The method encompasses a step of furnishing at least one localization map that represents at least one position, read in by a vehicle reading-in unit, of a landmark. The method further encompasses a step of reading in a radar map via an interface, the radar map having or mapping at least one further position, furnished by way of radar measurement by a satellite, of the landmark in the radar map. Lastly, the method encompasses a step of generating and storing an optimized localization map using the localization map and the radar map, such that upon generation of the optimized localization map, the read-in position of the landmark is altered using the further (Continued)

position to yield a modified position of the landmark, and is stored in order to create the optimized localization map.

13 Claims, 5 Drawing Sheets

(51) Int. Cl.
| | | |
|---|---|---|
| *G01S 13/90* | (2006.01) | |
| *G01S 13/89* | (2006.01) | |
| *G01S 19/48* | (2010.01) | |
| *G01S 7/48* | (2006.01) | |
| *G01S 17/88* | (2006.01) | |
| *G01S 13/931* | (2020.01) | |

(52) U.S. Cl.
CPC ............ *G06F 16/29* (2019.01); *G01S 7/4808* (2013.01); *G01S 17/88* (2013.01); *G01S 2013/9322* (2020.01)

(56) References Cited

U.S. PATENT DOCUMENTS

| | | | |
|---|---|---|---|
| 8,593,301 B2* | 11/2013 | Newman | G08G 1/0965 340/902 |
| 8,698,824 B1* | 4/2014 | Wang | G06T 17/05 345/537 |
| 10,203,210 B1* | 2/2019 | Tagawa | G01C 21/32 |
| 2011/0047338 A1* | 2/2011 | Stahlin | G01C 21/32 711/154 |

FOREIGN PATENT DOCUMENTS

| | | |
|---|---|---|
| EP | 2051224 A1 | 4/2009 |
| JP | H11249552 A | 9/1999 |

\* cited by examiner

METHOD AND APPARATUS FOR CREATING AN OPTIMIZED LOCALIZATION MAP AND METHOD FOR CREATING A LOCALIZATION MAP FOR A VEHICLE

FIELD OF THE INVENTION

The approach proceeds from an apparatus or a method. A further subject of the present approach is a computer program.

BACKGROUND INFORMATION

Advanced driver assistance systems (ADAS) and highly automated vehicle systems for urban automated driving (UAD) require increasing levels of situation awareness and detailed knowledge about vehicle surroundings. Accurate localization is necessary for this purpose. Apparatuses exist for extracting landmarks from aerial images of roads. Those landmarks are stored in a map and then used for vehicle localization.

SUMMARY

In light of the above, the approach presented here presents a method for creating an optimized localization map, furthermore an apparatus that uses that method, a method for creating a localization map, and lastly a corresponding computer program.

A method for creating an optimized localization map for a vehicle is presented, the method encompassing at least the following steps:

furnishing at least one localization map that represents at least one position, read in by a vehicle reading-in unit, of a landmark;

reading in a radar map via an interface, the radar map having or mapping at least one further position, furnished by way of radar measurement by a satellite, of the landmark in the radar map; and generating and storing an optimized localization map using the localization map and the radar map, such that upon generation of the optimized localization map, the read-in position of the landmark is altered using the further position to yield a modified position of the landmark, and is stored in order to create the optimized localization map.

This method can be implemented, for example, in software or in hardware or in a mixed form of software and hardware, for example in a control unit.

A "landmark" can be understood as any static object that can serve for vehicle localization and/or navigation, for instance infrastructure elements such as road signs or street light poles or gantry signs. An "optimized localization map" can be understood as a map in which at least one position of a landmark has been determined by considering the position from the radar map and the position from the localization map. That determined position is then usually very close to the actual geographic position of the landmark. The method presented here thus serves to optimize localization maps using radar maps. This is useful because localization maps that have been generated, for example, by way of vehicle sensor signals of vehicle reading-in units on vehicles or sensor systems on vehicles are often inaccurate. Because, as a result of the approach presented, even inaccurate localization maps can serve for creation of the highly accurate optimized localization map, cost-intensive vehicle reading-in units are not needed in vehicles in order to create the localization maps.

In the furnishing step the read-in position, and/or in the reading-in step the further position, can represent a geographic position of a traffic infrastructure element, in particular a pole position of a pole, constituting a landmark; in particular, the pole can be a supporting element of a traffic infrastructure device. Poles, for example road signs that are mounted on poles, are important for orientation in road traffic. A "pole" can, however, also be understood as a streetlight and/or a power pole. Because the proportion of metal is usually high, poles can also easily be recognized by satellites using radar.

It is advantageous if, in the generating step, the modified position is generated using a calculated rotation matrix and/or a calculated translation vector and/or a calculated scaling factor. As a result, the modified position in the optimized localization map can be, for example, an average value between the position from the localization map and the position from the radar map.

In the reading-in step, a radar map furnished by way of a TerraSAR-X satellite can be read in as a radar map; in particular, a further position of the landmark, sensed by radar, is read into the radar map. This satellite supplies highly accurate positions of landmarks which can serve ideally as orientation values for generating the modified positions.

Also conceivable is an embodiment of the method presented here having a step of transmitting the optimized localization map to a central computer disposed outside the vehicle, in particular the transmitting step being carried out using a wireless transfer method. Once an optimized localization map has been generated in a vehicle, it can thereby also be used in further vehicles with no need for a corresponding optimized localization map to be generated in those vehicles. The optimized localization map can then, for example, be loaded directly from the central computer. The advantages of the approach presented here can thereby be utilized even in vehicles that are not equipped with the property of optimizing a localization map using data from a radar map.

According to a further embodiment, a method for creating a localization map for a vehicle is also presented here, the method encompassing at least the following steps:

reading in at least one position of a landmark in a surroundings of a vehicle via an interface; and generating the localization map utilizing the read-in position of the landmark.

This method can serve to furnish the localization map required for the method presented above.

A particularly advantageous embodiment of the approach presented here is one in which, in the reading-in step, a position of the landmark sensed by way of an optical, lidar-based, and/or radar-based sensor system, or a vehicle reading-in unit of the vehicle, is read in. Sensors that in most cases are installed as standard in the vehicle can thereby be used in multiple ways so that in the approach presented here, for example, the localization map can also be created.

Also presented here is an apparatus that has units or interfaces embodied to implement and/or execute the steps of an embodiment of the method presented here. This variant embodiment of the approach in the form of an apparatus also makes it possible to achieve, quickly and efficiently, the object on which the approach is based.

For that purpose the apparatus can be disposed in a vehicle or can be embodied to be disposed in a vehicle.

Also advantageous is a computer program product or computer program having program code that can be stored on a machine-readable medium or memory medium such as a semiconductor memory, a hard-drive memory, or an optical memory, and can be used to carry out, implement, and/or control the steps of the method according to one of the embodiments described above, in particular when the program product or product is executed on a computer or on an apparatus.

DETAILED DESCRIPTION

In the description below of favorable exemplifying embodiments of the present approach, identical or similar reference characters are used for elements that function similarly and are depicted in the various Figures, repeated description of those elements being omitted.

Figure 1:
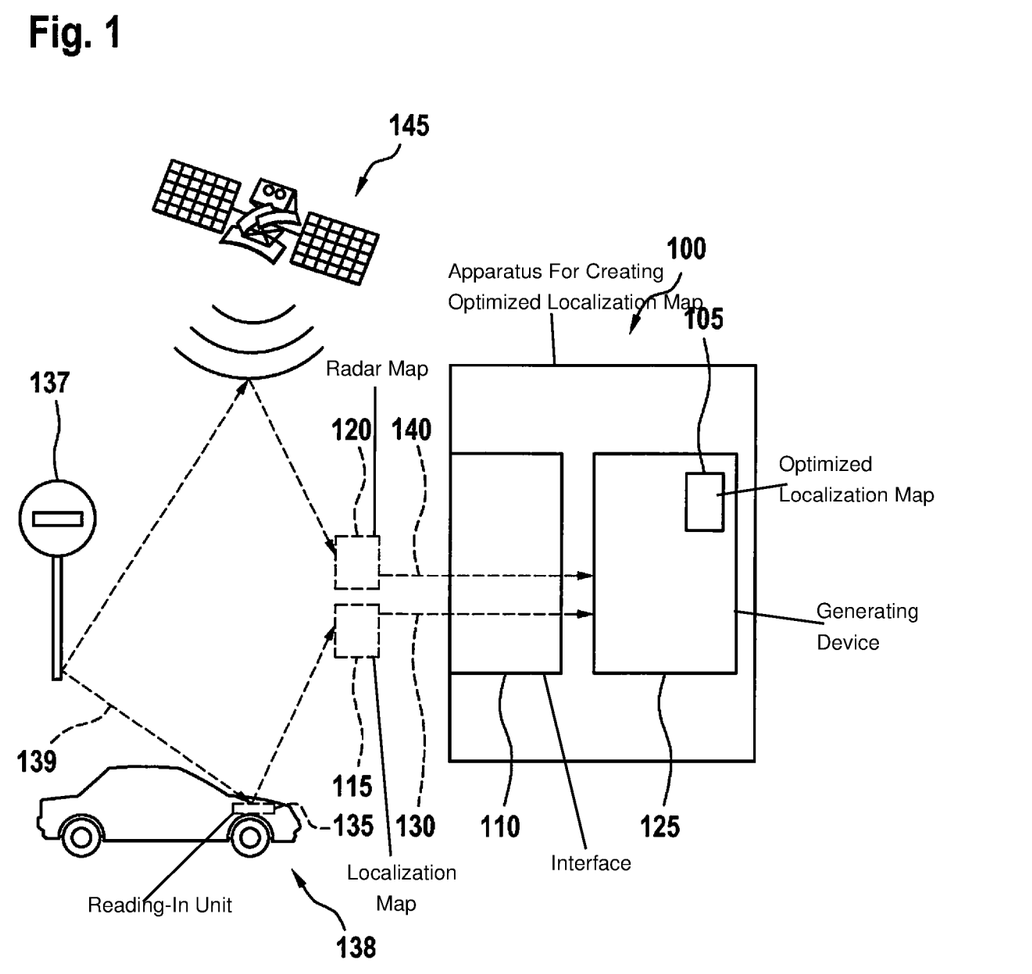
FIG. 1 schematically depicts an apparatus for creating an optimized localization map, in accordance with an exemplifying embodiment.

FIG. 1 schematically depicts an apparatus 100 for creating an optimized localization map 105, in accordance with an exemplifying embodiment. Apparatus 100 encompasses an interface 110 for reading in a localization map 115, an interface 110 for reading in a radar map 120, and a generating device 125. In accordance with this exemplifying embodiment, apparatus 100 encompasses only one reading-in interface 110, which is embodied to serve as interface 110 for reading in both localization map 115 and radar map 120. According to an alternative exemplifying embodiment, apparatus 100 can also have two separate interfaces 110 for reading in localization map 115 and radar map 120.

Interface 110 for reading in localization map 115 is embodied to furnish at least one localization signal 130 that represents a localization map in which a position, read in from a vehicle reading-in unit 135, of a landmark 137 is mapped in localization map 115. In accordance with this exemplifying embodiment, landmark 137 is in the form of a road sign. In accordance with this exemplifying embodiment, vehicle reading-in unit 135 is disposed on or in a vehicle 138 and is embodied to read in a vehicle sensor signal 139 and to generate localization map 115 from that vehicle sensor signal 139, vehicle sensor signal 139 representing the position of landmark 137. Vehicle sensor signal 139 can be generated, for example, via an optical, radar-assisted, or lidar-assisted sensor system of vehicle 138, for example by the fact that a geographic coordinate of the traffic infrastructure system, e.g. the pole of the road sign, is sensed as landmark 137 and is entered into a map. A positioning system such as the GPS, Glonass, or Galileo positioning system can be used for this purpose, for example, to identify the current geographic position of vehicle 138 and, utilizing the positioning data of landmark 137 from the vehicle sensor system (which can be calculated by vehicle reading-in unit 135), to ascertain the geographic position of the landmark in localization map 115.

Interface 110 for reading in radar map 120 is embodied to read in at least one radar map signal 140 that represents a radar map 120 generated and furnished by a satellite 145; in that radar map 120, landmark 137 that was used to generate localization map 120 is now entered in radar map 120 as a further position of landmark 137. The geographic position of landmark 137 can thereby be ascertained by way of different measurements, namely on the one hand by localization using the vehicle sensor system, and on the other hand by localization using radar from satellite 145.

Generating device 125 is embodied to generate and store optimized localization map 105 using localization map 115 and radar map 120; upon generation 315 of optimized localization map 105, the read-in position of landmark 137 is altered, utilizing the further position, to yield a modified position of landmark 137, and stored in order to create optimized localization map 105.

Apparatus 100 is furthermore embodied to read in from localization map 115 information that, for example, cannot be directly perceived and/or read in by a sensor apparatus such as vehicle reading-in unit 135 of the or of a vehicle 138. This includes, for instance, information regarding roadway paths beyond sensor detection range, as well as traffic regulations, which can be stored in localization map 115. This information can likewise be stored in optimized localization map 105.

Aspects already described with reference to FIG. 1 will be addressed again in further detail below:

The approach allows localization maps 115 to be optimized by matching, i.e. reconciliation, with the more-accurate radar maps 120. Radar maps 120 are thus a critical constituent leading to, for example, highly automated vehicle systems for vehicles 138. The modified positions in optimized localization map 105 are very much more accurate and reliable than those that have been ascertained, for example, solely by way of GPS for use in order to carry out localization with a standard deviation of approximately 0.3 m, or by way of high-accuracy dGPS modules that theoretically achieve an accuracy of 0.02 m but function unreliably in an urban environment due to multipath propagation and shielding effects.

The creation of high-accuracy localization maps 115 has hitherto represented a very large cost outlay because the aspects below, among others, must be considered. No distortions must occur in localization map 115, i.e. the distance between the objects, in other words landmarks 137, in localization map 115 must not be subject to large errors. It is also important that the objects that are entered in localization map 115 as landmarks 137 be catalogued with a specific accuracy.

It is precisely this issue that is addressed by the approach presented here: Localization maps 115 are recorded using conventional sensors in the form of vehicle reading-in units 135 on vehicles 138, and are optimized using a high-accuracy radar map 120, for example from TerraSAR-X satellite 145. High-accuracy radar maps 120 can be created very quickly with TerraSAR-X satellite 145. The detail content of radar maps 120 is not sufficient by itself, however, since only landmarks 137 such as poles, e.g. street lights and signs, are easily visible under certain conditions. The high-accuracy pole positions, in the form of the further positions, can be indicated in global coordinates. Radar map signals 140 are used in turn to optimize the less-accurate localization map 115 recorded by vehicle 138. In addition, simpler and therefore less expensive measurement equipment, in the form of vehicle reading-in units 135 in vehicle 138, can be used, and the cost and quality of the map material can thereby be optimized.

Apparatus 100 that is presented is embodied to create a high-accuracy map (optimized localization map 105) for vehicle localization. For that, firstly localization map 115 of the surroundings is created using vehicles 138, for example surveying vehicles. Localization map 115 is still affected by inaccuracy/noise as a function of vehicle reading-in unit 135. A map having high-accuracy position information (radar map 120) is therefore used for individual landmark types. Radar map signals 140 that correspond to radar map 120, or to the further positions that are stored in radar map 120, are used in order to improve the accuracy of localization map 115. Thanks to that improvement, depending on the accuracy required for optimized localization map 115 an inexpensive sensor suite can be used to create localization map 115. The approach therefore advantageously influences the accuracy of localization map 115 and contributes to a decrease in costs for map creation.

Localization map 115 can encompass labeled point clouds from a lidar sensor, or a list of positions of static objects. The approach makes it possible to avoid sensor measurement noise and distortions in optimized localization map 105 which result, for instance, from inaccuracies when matching sensor measurements.

Figure 2:
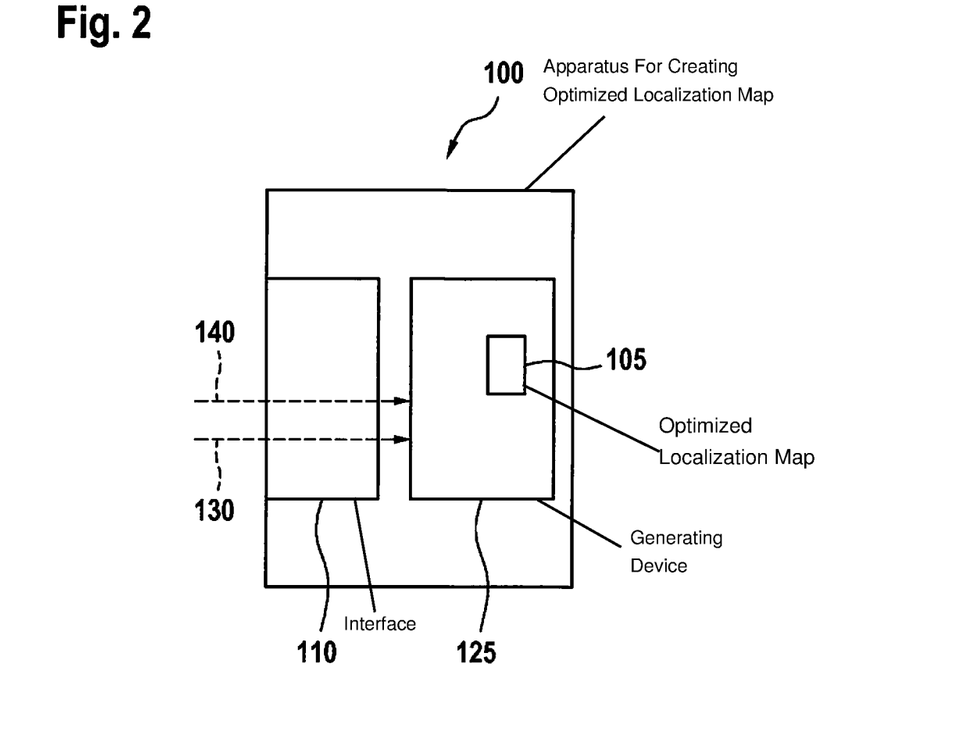
FIG. 2 schematically depicts an apparatus in accordance with an exemplifying embodiment.

FIG. 2 schematically depicts an apparatus 100 in accordance with an exemplifying embodiment. This can be apparatus 100 described with reference to FIG. 1, which is depicted here in isolation for better clarity.

Figure 3:
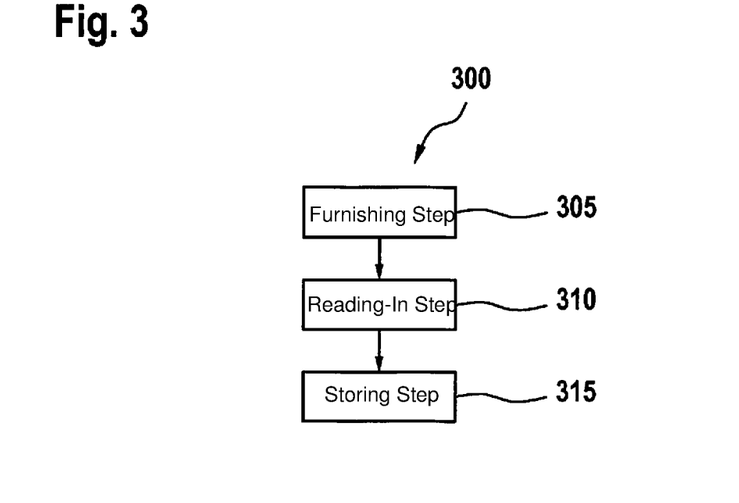
FIG. 3 is a flow chart of a method for creating an optimized localization map, in accordance with an exemplifying embodiment.

FIG. 3 is a flow chart of a method 300 for creating an optimized localization map, in accordance with an exemplifying embodiment. This can be a method 300 that is executable by an apparatus described with reference to the preceding Figures.

In a furnishing step 305, at least the one localization map 115, which represents at least a position of a landmark 137 read in by a vehicle reading-in unit 135, is furnished. In a reading-in step 310, a radar map 120 is read in via an interface 110; radar map 120 has or maps at least one further position, furnished via radar measurement by a satellite 145, of landmark 137 in radar map 120. Lastly, in a generating and storing step 315, an optimized localization map 105 is generated using localization map 115 and radar map 120, and stored; upon generation 315 of optimized localization map 105, the read-in position of landmark 137 is altered using the further position to yield a modified position 700 of the landmark, and stored in order to create optimized localization map 105.

Figure 4:
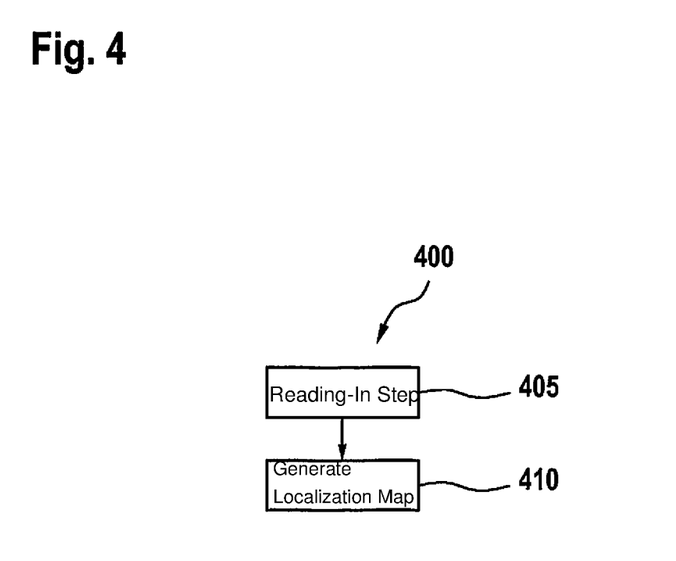
FIG. 4 is a flow chart of a method for creating an optimized localization map, in accordance with an exemplifying embodiment.

FIG. 4 is a flow chart of a method 400 for creating a localization map, in accordance with an exemplifying embodiment. This can be a method 400 that is embodied to create the localization map described with reference to FIG. 1.

In a reading-in step 405, at least one position of a landmark 137 in a surroundings of vehicle 138 can be read in via an interface 110. In a step 410 of generating localization map 115, the localization map can then be generated using the read-in position of landmark 137.

Figure 5:
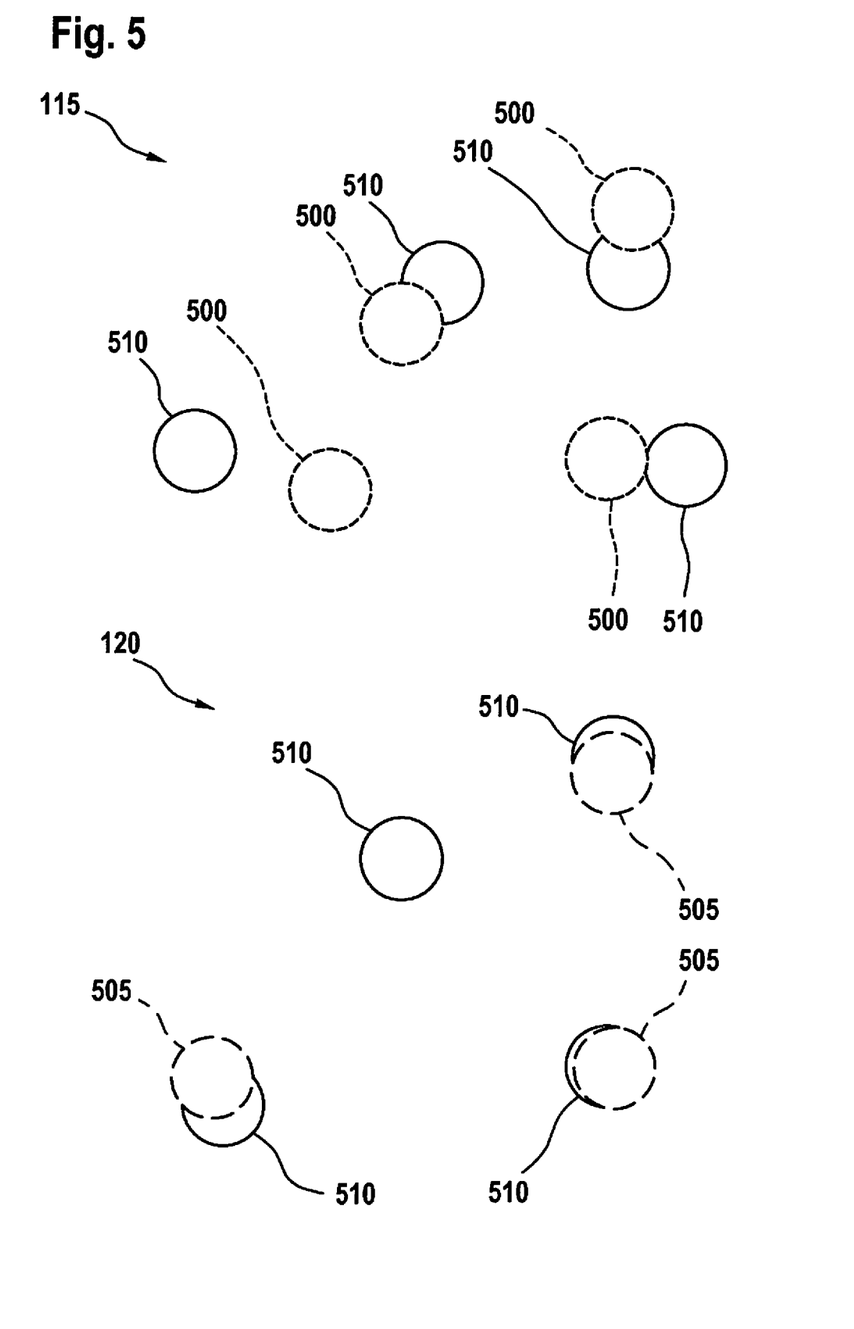
FIG. 5 schematically depicts positions of landmarks on a localization map and further positions of the landmarks on a radar map, in accordance with an exemplifying embodiment.

FIG. 5 schematically depicts positions 500 of landmarks on a localization map 115 and further positions 505 of the landmarks on a radar map 120, in accordance with an exemplifying embodiment. This can refer to localization map 115 and radar map 120 described with reference to FIG. 1. In accordance with this exemplifying embodiment, landmark positions 510 indicate real positions of the landmarks. It is evident from FIG. 5 that positions 500 in localization map 115 deviate more greatly from landmark positions 510 in localization map 115 than further positions 505 in radar map 120 deviate from landmark positions 510 in radar map 120.

Figure 6:
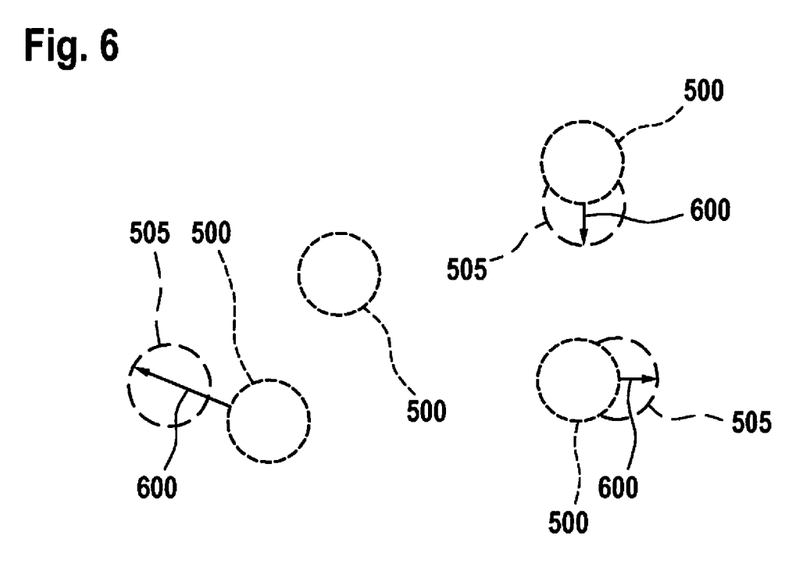
FIG. 6 schematically depicts relationships between positions and further positions, in accordance with an exemplifying embodiment.
Figure 7:
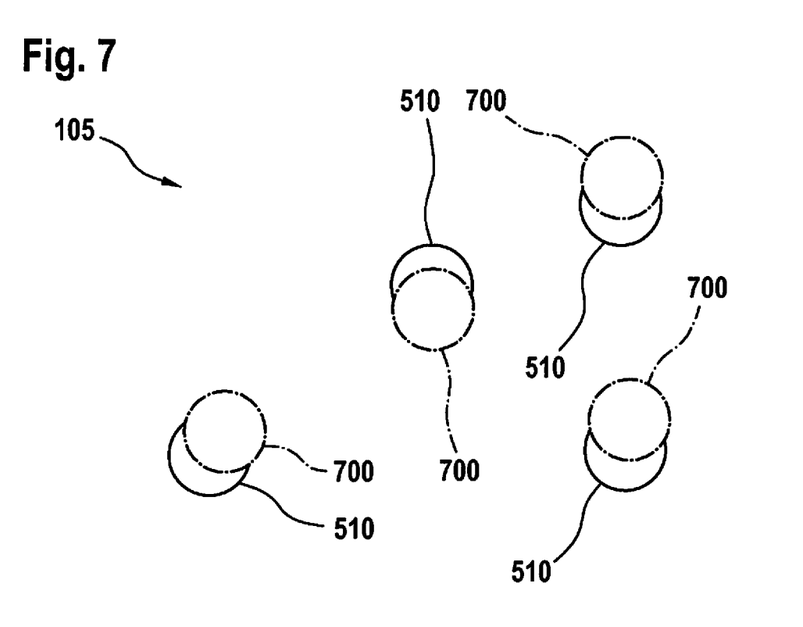
FIG. 7 schematically depicts modified positions in an optimized localization map, in accordance with an exemplifying embodiment.

FIG. 6 schematically depicts relationships 600 between positions 500 and further positions 505, in accordance with an exemplifying embodiment. This can refer to positions 500 and further positions 505 depicted with reference to FIG. 5, which here are depicted superimposed. The modified positions depicted with reference to FIG. 7 are generated using a calculated rotation matrix and/or a calculated translation vector and/or a calculated scaling factor which represent(s) relationship 600 of positions 500 to further positions 505.

Upon generation of the modified positions, a matching algorithm is used in order to match positions 500 of the landmarks with further positions 505 of the landmarks, and to determine correspondences, i.e. relationships 600, between the landmarks in the localization map (which can also be referred to as a "vehicle map") and in radar map 120 (which can also be referred to as a "satellite map"). The result is a rotation matrix, a translation vector, and a scaling factor. The global orientation of the localization map can be determined in accordance with the calculated rotation and translation. The localization map can be distortion-corrected by scaling. After this operation, the global coordinates are known. The optimized localization map has furthermore been distortion-corrected, so that the accuracy and consistency of the optimized localization map are improved.

An accuracy of the optimized localization map can be significantly improved, compared with an accuracy of the localization map, by generating the optimized localization map. This allows further issues to be addressed when creating localization maps:

According to the procedure described above, high-accuracy optimized localization maps can be created using high-accuracy sensors and optimization methods when creating and optimizing the localization maps.

According to the procedure described above, accurate optimized localization maps can be created using inaccurate sensors and optimization methods for creating and optimizing the localization maps.

Savings can thus be realized in terms of equipping, for example, surveying vehicles and other hardware for creating localization maps.

The advantages of the approach consist in a reduction in costs for creating high-accuracy localization maps and an improvement in the accuracy—absolutely in terms of global coordinates, and relative to other landmarks—of positions 500 of localization maps thanks to the modified positions.

In contrast to apparatuses for extracting landmarks from aerial images of roads, the approach aims to optimize the accuracy of localization maps by creating the optimized localization map with the aid of high-accuracy radar maps.

FIG. 7 schematically depicts modified positions 700 in an optimized localization map 105, in accordance with an exemplifying embodiment. This can refer to an optimized localization map 105 described with reference to the preceding Figures.

In summary, the approach presented here can be outlined as follows: Firstly, radar maps, or at least one radar map, from a satellite are/is recorded, and landmarks are extracted.

A "landmark" can be regarded here, for example, as a base point of steel posts, due to the particular reflection properties in terms of radar radiation. That radar map is then populated with comparatively few, but high-accuracy, georeferenced landmarks, which are referred to here as "further position(s)." Concurrently or earlier or later in time, a vehicle can record measured data and generates a localization map. That localization map is quite inaccurate, since it is possible that no reference sensors were used. The localization map is then optimized with the aid of the radar map(s), but can also be used to detect changes in localization maps. The map obtained from that optimization is referred to here as "optimized localization map." This optimized localization map is made available to any vehicle systems, for instance from a back-end server, in order to enable localization by the localization modules of the vehicle systems.

If an exemplifying embodiment encompasses an "and/or" correlation between a first feature and a second feature, this is to be read to mean that the exemplifying embodiment according to one embodiment has both the first feature and the second feature, and according to a further embodiment has either only the first feature or only the second feature.

What is claimed is:

1. A method for creating an optimized localization map for a vehicle, comprising:
   furnishing at least one localization map that represents at least one position, read in by a vehicle reading-in unit, of a landmark;
   reading in a radar map via an interface, the radar map one of having and mapping at least one further position, furnished by way of radar measurement by a satellite, of the landmark in the radar map; and
   generating and storing an optimized localization map using the localization map and the radar map, such that upon generation of the optimized localization map, the read-in position of the landmark is altered using the further position to yield a modified position of the landmark, and is stored in order to create the optimized localization map.

2. The method as recited in claim 1, wherein at least one of the read-in position with respect to the furnishing step and the further position with respect to the reading-in represents a geographic position of a traffic infrastructure element corresponding to the landmark.

3. The method as recited in claim 2, wherein the geographic position of the traffic infrastructure includes a pole position of a pole, and wherein the pole is a supporting element of a traffic infrastructure device.

4. The method as recited in claim 1, wherein in the generating step, the modified position is generated using at least one of a calculated rotation matrix, a calculated translation vector, and a calculated scaling factor.

5. The method as recited in claim 1, wherein in the reading-in step, the radar map is furnished by way of a TerraSAR-X satellite, and wherein the further position (505) of the landmark, sensed by radar, is read into the radar map.

6. The method as recited in claim 1, further comprising:
   transmitting the optimized localization map to a central computer disposed outside the vehicle.

7. The method as recited in claim 6, wherein the transmitting step is carried out using a wireless transfer method.

8. A method for creating a localization map for a vehicle, comprising:
   reading in at least one position of a landmark in a surroundings of the vehicle via an interface; and
   generating the localization map utilizing the read-in position of the landmark.

9. The method as recited in claim 8, wherein in the reading-in step, the position of the landmark is read-in by at least one of an optical-based sensor system, a lidar-based sensor system, a radar-based sensor system, and a vehicle reading-in unit of the vehicle.

10. The method as recited in claim 1, wherein the localization map is created by:
    reading in at least one position of the landmark in a surroundings of the vehicle via the interface; and
    generating the localization map utilizing the read-in position of the landmark.

11. An apparatus for creating an optimized localization map for a vehicle, comprising:
    an arrangement for furnishing at least one localization map that represents at least one position, read in by a vehicle reading-in unit, of a landmark;
    an arrangement for reading in a radar map via an interface, the radar map one of having and mapping at least one further position, furnished by way of radar measurement by a satellite, of the landmark in the radar map; and
    an arrangement for generating and storing an optimized localization map using the localization map and the radar map, such that upon generation of the optimized localization map, the read-in position of the landmark is altered using the further position to yield a modified position of the landmark, and is stored in order to create the optimized localization map.

12. A computer program that is configured to at least one of execute and control a method for creating an optimized localization map for a vehicle, the method comprising:
    furnishing at least one localization map that represents at least one position, read in by a vehicle reading-in unit, of a landmark;
    reading in a radar map via an interface, the radar map one of having and mapping at least one further position, furnished by way of radar measurement by a satellite, of the landmark in the radar map; and
    generating and storing an optimized localization map using the localization map and the radar map, such that upon generation of the optimized localization map, the read-in position of the landmark is altered using the further position to yield a modified position of the landmark, and is stored in order to create the optimized localization map.

13. A tangible and non-transitory machine-readable memory medium on which a computer program is stored that is configured to at least one of execute and control a method for creating an optimized localization map for a vehicle, the method comprising:
    furnishing at least one localization map that represents at least one position, read in by a vehicle reading-in unit, of a landmark;
    reading in a radar map via an interface, the radar map one of having and mapping at least one further position, furnished by way of radar measurement by a satellite, of the landmark in the radar map; and
    generating and storing an optimized localization map using the localization map and the radar map, such that upon generation of the optimized localization map, the read-in position of the landmark is altered using the further position to yield a modified position of the landmark, and is stored in order to create the optimized localization map.

* * * * *